(12) United States Patent
Halava

(10) Patent No.: US 10,741,197 B2
(45) Date of Patent: Aug. 11, 2020

(54) COMPUTER-IMPLEMENTED CRIMINAL INTELLIGENCE GATHERING SYSTEM AND METHOD

(71) Applicant: Amos Halava, Hampton, TN (US)

(72) Inventor: Amos Halava, Hampton, TN (US)

(*) Notice: Subject to any disclaimer, the term of this patent is extended or adjusted under 35 U.S.C. 154(b) by 729 days.

(21) Appl. No.: 15/352,541

(22) Filed: Nov. 15, 2016

(65) Prior Publication Data

US 2018/0137878 A1 May 17, 2018

(51) Int. Cl.
 *G10L 25/51* (2013.01)
 *G06F 16/68* (2019.01)

(52) U.S. Cl.
 CPC .............. *G10L 25/51* (2013.01); *G06F 16/68* (2019.01)

(58) Field of Classification Search
 None
 See application file for complete search history.

(56) References Cited

U.S. PATENT DOCUMENTS

| | | | | |
|---|---|---|---|---|
| 6,252,947 B1* | 6/2001 | Diamond | ............ | G11B 31/00 379/88.09 |
| 7,551,732 B2* | 6/2009 | Anders | ............ | H04L 63/30 379/191 |
| 7,825,813 B2 | 11/2010 | Farhan | | |
| 7,860,722 B1 | 12/2010 | Chow | | |
| 8,189,866 B1* | 5/2012 | Gu | ............ | G06K 9/00335 348/169 |
| 8,428,559 B2* | 4/2013 | Silva | ............ | H04L 12/1831 379/67.1 |
| 8,838,452 B2* | 9/2014 | Kan | ............ | G10L 25/00 704/238 |
| 9,113,131 B1* | 8/2015 | Passe | ............ | H04M 3/38 |
| 9,137,352 B2 | 9/2015 | Otto | | |
| 9,552,417 B2* | 1/2017 | Olligschlaeger | ..... | H04M 3/2281 |
| 9,641,676 B1* | 5/2017 | Mandic | ............ | H04M 3/42221 |
| 9,912,821 B1* | 3/2018 | Hodge | ............ | H04M 15/705 |
| 10,027,797 B1* | 7/2018 | Hodge | ............ | H04M 3/2281 |
| 10,063,694 B1* | 8/2018 | Hodge | ............ | H04M 3/38 |
| 2003/0009337 A1* | 1/2003 | Rupsis | ............ | H04L 29/06027 704/260 |
| 2008/0141180 A1* | 6/2008 | Reed | ............ | G06F 16/40 715/854 |
| 2013/0339035 A1* | 12/2013 | Chordia | ............ | G10L 19/00 704/500 |

\* cited by examiner

*Primary Examiner* — Kenny S Lin

(57) ABSTRACT

A computer-implemented criminal intelligence gathering system adapted to be deployed within a confinement facility. The system comprises target devices installed at strategic locations within a prison. A target device comprises a microphone for capturing auditory information, a compression module for eliminating periods of silence from the auditory information resulting in the generation of a compressed auditory information, a segment module for segmenting the compressed auditory information and a stamp module time-stamping each segment. The system further comprises a database listed with a plurality of target entries, each of which representing a target device. The database is configured to receive the segmented auditory information from at least one target device at a time such that, the received auditory information is associated with the corresponding target entry. The system further comprises a user interface for enabling remote retrieval of a segment stored within the database based on date, time and location.

29 Claims, 4 Drawing Sheets

COMPUTER-IMPLEMENTED CRIMINAL INTELLIGENCE GATHERING SYSTEM AND METHOD

BACKGROUND

Technical Field

The present disclosure relates to computer-implemented systems and methods for gathering criminal intelligence and more particularly relates to a system and a method for covertly gathering actionable criminal intelligence from within an inmate confinement facility.

In the United States, earlier this year, a prison inmate facing death penalty for a gruesome double murder acquired from a trustee a metal shank, which he used in an escape attempt. It was later disclosed that initially, the inmate planned to use the shank on a deputy jailer as a part of his escape plan, but later he modified his plan and used the shank to dig out of his prison cell. His escape attempt was promptly detected by motion sensors and the inmate was captured in the mechanical chase between his prison cell and an outside wall. Confidential informants reported that there was extensive verbal planning for this escape via talk in and between cells. Had the verbal conversations between the inmate and his trustees been gathered beforehand, the inmate could have not acquired the metal shank—the acquisition of which could have potentially lead to the injury or even death of the deputy jailor had the inmate not modified his earlier escape plan.

The aforementioned incident could have occurred in any prison. The only way to prevent such activities from happening is to have a security system designed to keep a closer eye on the inmates. As there is no expectation of privacy in a prison and as it is a matter of security, it is legally permissible to covertly gather criminal intelligence from inmates in order to stop any escape attempts at the planning stage.

There is a need in the art for a monitoring system or method that enables prison authorities to covertly gather actionable criminal intelligence not only from inmates' prison cells, but also from various areas in the prison. Gathering intelligence should be continuous and such a system and method that facilitates the collection of criminal intelligence must be efficient, cost-saving and easy to use.

SUMMARY

An embodiment of the present invention is a computer-implemented criminal intelligence gathering system, which is designed to run continuously. The system comprises a central device and a plurality of target devices disposed in operative communication with the central device. Each target device comprises a microphone, a target database and a processor, which is divided into a plurality of processing modules via a compression module, a segment module and a stamp module. The target devices are covertly installed at various strategic locations within the prison such as, within prison cells, the ventilators common between two adjoining prison cells, HVAC vents, maintenance rooms, cleaning closets and other normally inaccessible areas of the prison.

The target device picks up auditory information via the microphone thereof wherein, the auditory information captured by the microphone. The compression module parses the captured auditory information and eliminates periods of silence therefrom and thereby automatically records any auditory. In an additional embodiment, the compression module is further designed to recognize and eliminate commonplace sounds such as, door slams, toilet flushes, bed creaks, running water. With the periods of silence and unwanted commonplace sounds eliminated, the stream of auditory information is automatically and sequentially compressed resulting in only the compressed auditory information. The segment module divides the compressed auditory information into a plurality of segments, each of which being of a predetermined duration. The segments are then time-stamped by the stamp module. The time-stamped segments are then proceeded to be transitorily stored within the target database.

The central device comprises a central database comprising a plurality of target entries listed wherein, each target entry is representative of a target device. Each target entry is associated with a location entry, which represents the location at which the corresponding target device is covertly installed. Each target device is configured to transmit time-stamped segments stored within the respective target databases to the central device. Each target device is assigned a time window defined between a start and an end time wherein, the system is configured such that, a target device, every day, at the specific time window transmits the segments stored within the corresponding target database in a chronological order. This transmission of one device at a time rather than a one time bulk transmission is cost efficient as it prevents infrastructure overload. The segments thus transmitted from the target devices are stored within the central database. More particularly, each segment is associated with the corresponding target entry within the central database.

The user interface enables a user to retrieve segments from the central database based on time, date and the location of the corresponding target device. The retrieved segments are delivered to a user terminal over a communications network. The central device further comprises an alert module for issuing an alert in the event of the central device not receiving segments from a target device at its designated time window. In one embodiment, in addition to a microphone, each target device may employ at least one of additional devices comprising a smoke sensor, cell phone signal detection sensor, motion sensor and a video camera.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the accompanying drawings, which form a part of this disclosure, wherein.

Figure 1:
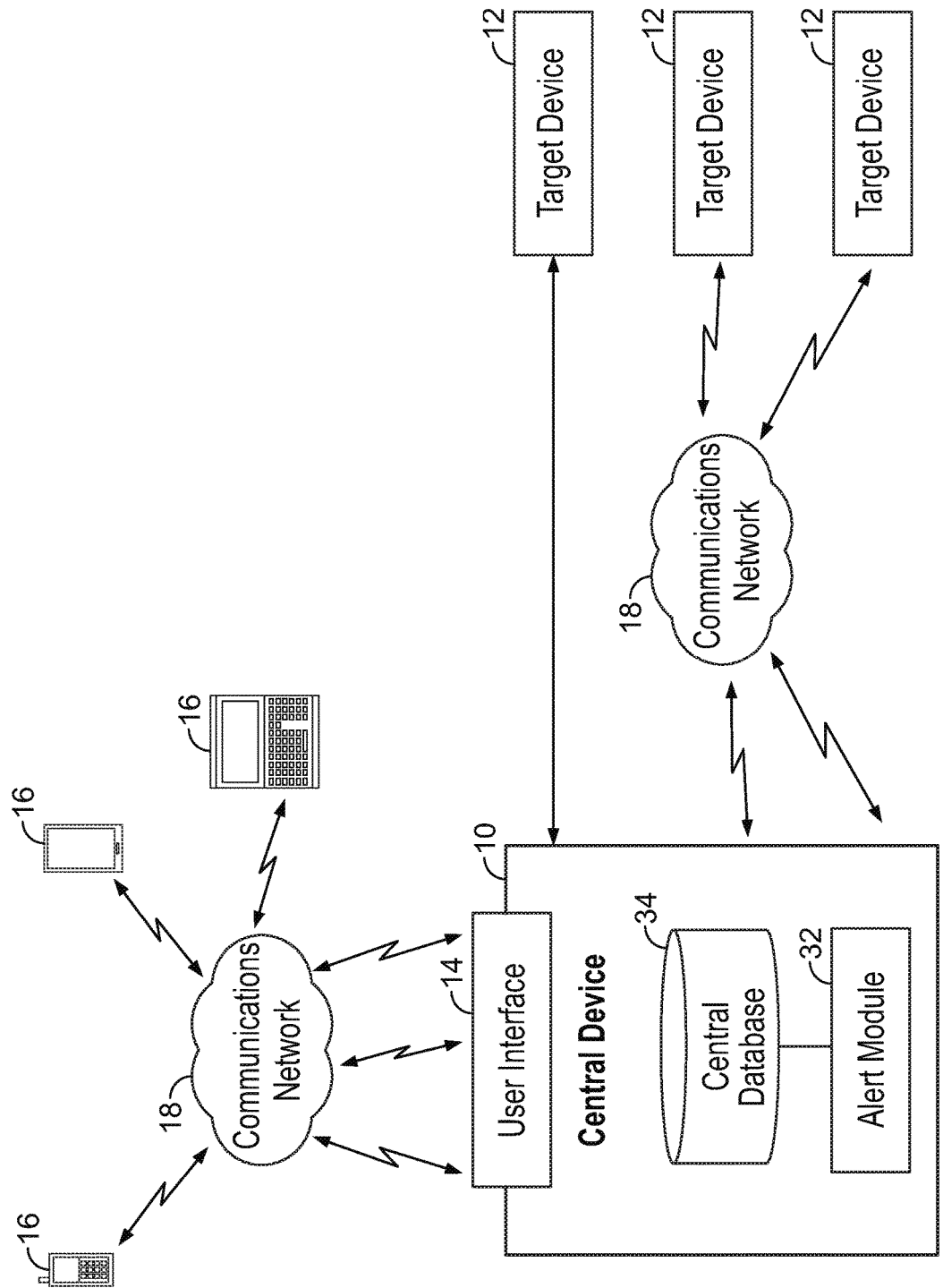
FIG. 1, according to an embodiment of the present invention, is a schematic block diagram of the computer-implemented criminal intelligence gathering system and accompanying elements.

The various aspects of the present disclosure mentioned above are described in further detail with reference to the

FIGURES—REFERENCE NUMERALS

10—Central Device
12—Target Device
14—User Interface
16—User Terminal
18—Communications Network
20—Microphone
22—Processor
24—Compression Module
26—Segment Module
28—Stamp Module
30—Target Database
32—Alert Module
34—Central Database

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Embodiments of the present invention are directed to a computer-implemented criminal intelligence gathering system and method. The system and method are adapted to be employed within a confinement facility so as to covertly gather actionable criminal intelligence from the inmates thereof in order to assist the authorities to eliminate inmates' breakout plans. The gathering of actionable criminal intelligence includes documentation of criminal tactics, techniques and procedures (TTPs). The confinement facility comprises a prison or alternatively, a correctional facility, remand center, detention center, penitentiary, which comprises a plurality of prison cells that are generally located adjacent to one another. The embodiments of the present invention help not only in capturing criminal intelligence in a general sense, but also in targeting a specific individual for the intelligence. The embodiments are configured to be easily integrated with existing security and investigative TTPs and are also easy to learn, train and implement.

Referring to FIG. 1, the computer-implemented criminal intelligence gathering system is of simple architecture comprising a central device 10 and a plurality of target devices 12 disposed in operative communication with the central device 10. Via a user interface 14 provided by the central device 10, the system is adapted to be remotely accessed from a user terminal 16 such as a smartphone, a tablet, a laptop, over a communications network 18, which may comprise a wired such as, Ethernet, a wireless communications network such as the Internet, Local Area Network (LAN), or a combination thereof as specifically shown in the referred illustration. Notably, the system is configured to gather intelligence continuously.

Figure 2:
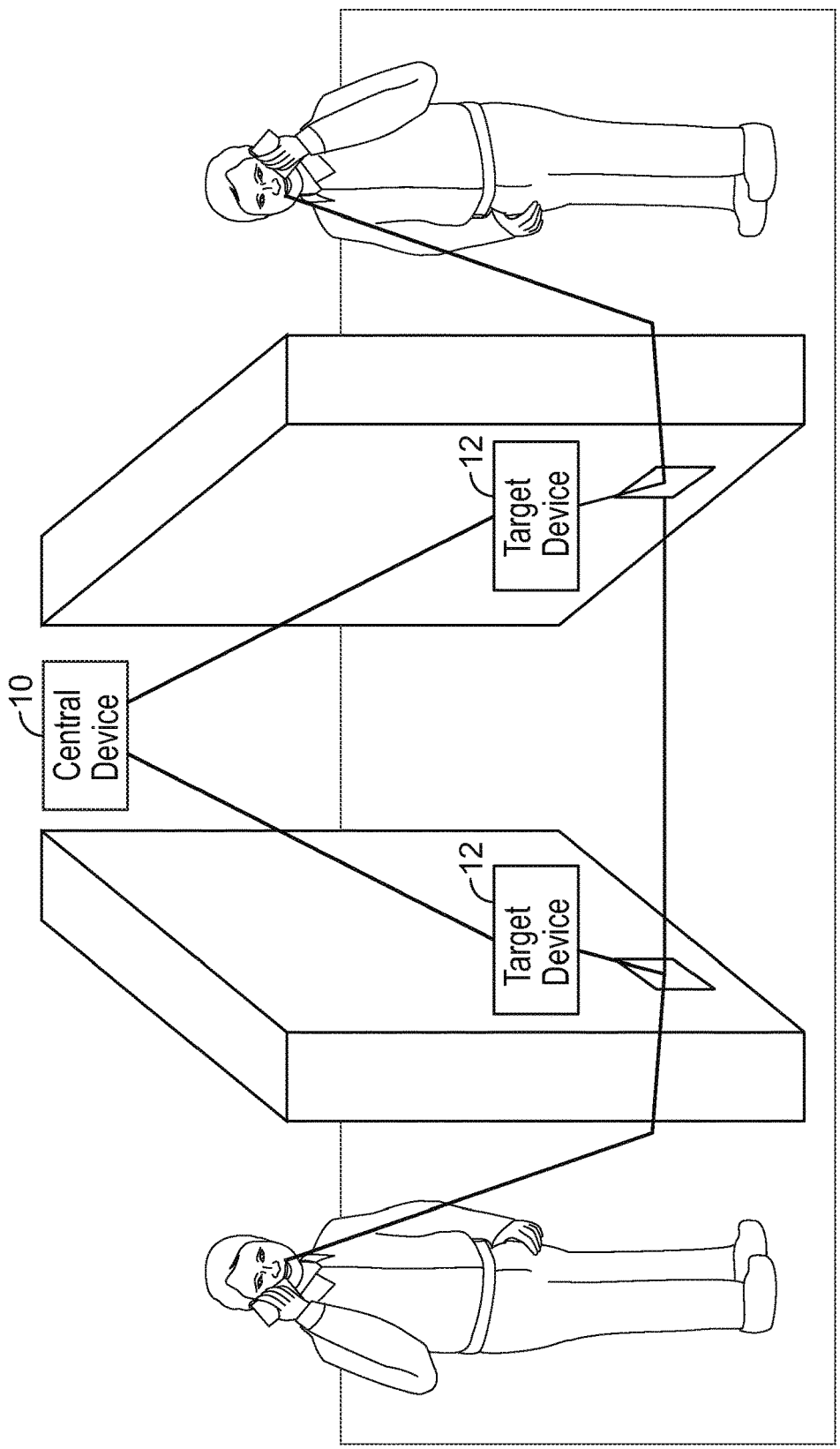
FIG. 2, according to an embodiment of the present invention, is an exemplary depiction of the covert installation of target devices between two prison cells.
Figure 3:
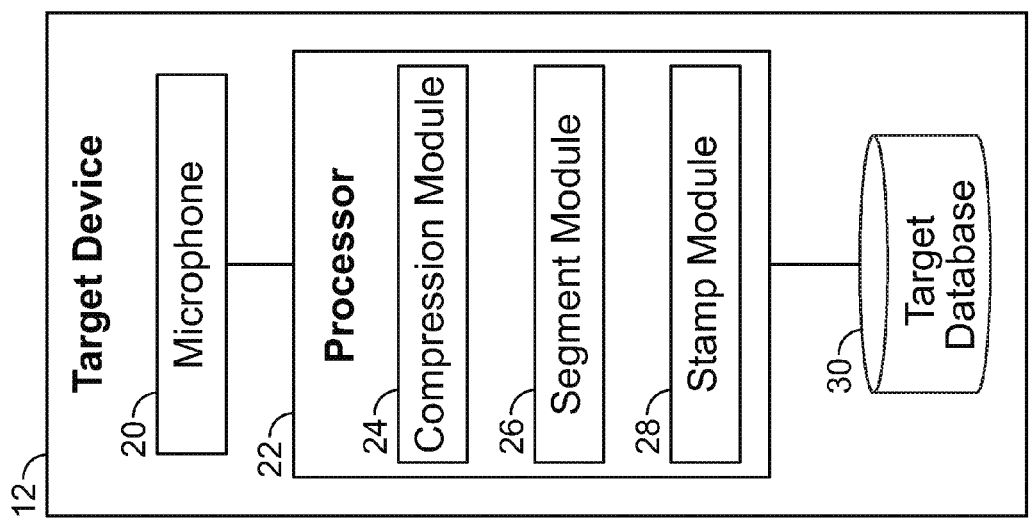
FIG. 3, according to an embodiment of the present invention, is a schematic block diagram of the target device.

Referring to FIGS. 1 through 3, each target device 12 comprises a microphone 20, a target database 30 and a processor 22. The processor 22, for ease of understanding, is divided into a plurality of processing modules via a compression module 24, a segment module 26 and a stamp module 28, the utility of each of which will become apparent from the following body of text. As there is no expectation of privacy in prisons, in order to gather criminal intelligence, the target devices 12 are covertly installed at various strategic locations within the prison such as, within prison cells, the ventilators common between two adjoining prison cells, HVAC vents, maintenance rooms, cleaning closets and other normally inaccessible areas of the prison. An exemplary placement of the target devices 12 is shown in FIG. 2, which is on the outer surfaces of the walls of two adjacent prison cells. In an additional embodiment, the target devices 12 can even be placed on prison work gang vehicles so as to gather intelligence from the inmate or inmates exchanging conversation on the work gang vehicles.

Referring to FIGS. 1 and 3, the target device 12 picks up auditory information via the microphone 20 thereof wherein, the auditory information captured by the microphone 20 is processed through a sound card (not shown) so as to digitalize the auditory information. The compression module 24 is configured such that, as the auditory information outputted from the sound card, the compression module 24 parses the same and eliminates periods of silence automatically leaving a resultant auditory information. In an additional embodiment, the compression module 24 is further designed to recognize and eliminate commonplace sounds such as, door slams, toilet flushes, bed creaks, running water. In another additional embodiment, the compression module 24 is configured to recognize a voice so as to keep portion or portions of the auditory information featuring voice or voices of inmates even in the event of said voices being run in combination of the aforementioned commonplace sounds. The compression module 24 is further configured such that, as the periods of silences and unwanted commonplace sounds are eliminated, the stream of auditory information is automatically and sequentially compressed resulting the generation of compressed auditory information, which most likely comprises inmate conversations.

Referring to FIGS. 1 and 3, the segment module 26 is configured to divide the compressed auditory information outputted from the compression module 24 into a plurality of segments. Notably each segment comprises a sequential audio file of a predetermined duration, which preferably is 30 minutes. The segments are then date and time-stamped by the stamp module 28. More particularly, the audio file is stamped on the visual signature thereof. The time-stamp especially comprises the start and end time of the conversation wherein, the actual time-difference between the start and end times of a segment ranges between 30 minutes to even several hours as the periods of silence combined with commonplace sounds may continue for several hours. The time-stamped segments are then proceeded to be transitorily stored within the target database 30.

Referring to FIGS. 1 and 3, the central device 10 comprises a central database 34 comprising a plurality of target entries, each target entry is representative of a target device 12. Each target entry is associated with a location entry, which represents the location at which the corresponding target device 12 is covertly installed. In an alternate embodiment, the target entry may itself by the location entry. In another alternate embodiment, each target entry is further associated with an inmate entry, which is representative of an inmate designated to a particular prison cell targeted by the target device 12 for capturing the auditory information. Each target device 12 is configured to transmit time-stamped segments stored within the respective target databases 30 to the central device 10. Each target device 12 is assigned a time window defined between a start and an end time wherein, the system is configured such that, a target device 12, every day, at the time window designated thereto, transmits the segments stored within the corresponding target database 30 in a chronological order. This transmission of one device at a time is instrumental in the prevention of infrastructure overload. As can be appreciated from FIG. 1, the transmission may comprise a wireless transmission over a communication network 18 or wired transmission via a suitable cable, preferably a Cat5 cable. The segments thus transmitted from the target devices 12 are stored within the central database 34. More particularly, each segment is associated with the corresponding target entry within the central database 34.

Referring to FIG. 1, the user interface 14 comprises date, time window and location input fields for enabling a user to retrieve segments from the central database 34 based on time, date and the location of the corresponding target device 12. The retrieved segments are delivered to a user terminal 16 over a communications network 18. The central device 10 further comprises an alert module 32 for issuing an alert in the event of the central device 10 not receiving segments from a target device 12 at its designated time window. In one embodiment, in addition to a microphone 20, each target device 12 may be associated with at least one of additional devices comprising a smoke sensor, cell phone signal detection sensor, motion sensor and a video camera so as to gather additional intelligence from the devices. In an additional embodiment, the system may further include external means for retrieving segments from the central database 34. The external means may comprise a link analysis system or a visualizer tool for further analysis.

Figure 4:
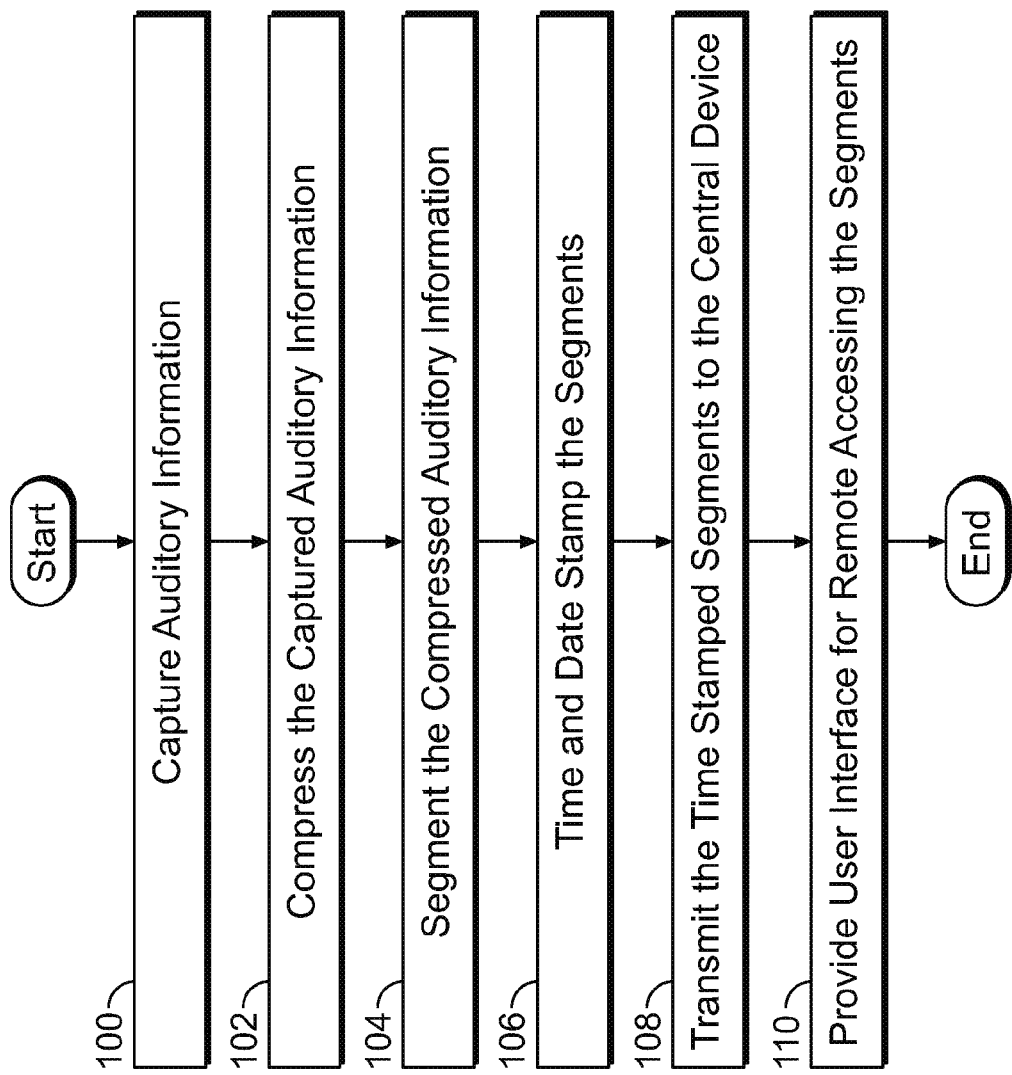
FIG. 4, according to an embodiment of the present invention, is a flowchart of the computer-implemented criminal intelligence gathering method.

Referring to FIG. 4, the computer-implemented criminal intelligence gathering method initiates with capturing (step 100) auditory information from a microphone, which is a part of a target device. As there is no expectation of privacy in prisons, in order to gather criminal intelligence, the target devices are covertly installed at various strategic locations within the prison such as, within prison cells, the ventilators common between two adjoining prison cells, HVAC vents, maintenance rooms, cleaning closets and other normally inaccessible areas of the prison. In an additional embodiment, the target devices can be placed on prison work gang vehicles so as to gather intelligence from the inmate or inmates exchanging conversation on the work gang vehicles. The auditory information captured by the microphone is digitalized as it is passed through a sound card. The method further comprises compressing (step 102) the digitalized auditory information by eliminating periods of silence. The compressed auditory information mostly comprises conversations between inmates. The compression is performed by a compression module, which is a part of the target device. In an additional embodiment, the compression method (step 102) further includes eliminating commonplace sounds such as, door slams, toilet flushes, bed creaks, running water. In another additional embodiment, the compression method (step 102) further includes recognizing a voice so as to keep portions of the auditory information featuring voice or voices of inmates in the event of said voices being run in combination of the aforementioned commonplace sounds. Notably as the periods of silences and unwanted commonplace sounds are eliminated, the stream of auditory information outputted from the compression module is automatically and sequentially compressed resulting the generation of compressed auditory information.

Referring to FIG. 4, the method further includes segmenting (step 104) the compressed auditory information into a plurality of segments, each being of a predetermined duration. Notably each segment comprises a sequential audio file of a predetermined duration, which preferably is 30 minutes. The segmentation is performed by a segment module, which comprises one of the processing modules of the target device. The method further comprises date and time-stamping (step 106) each segment as facilitated by a stamp module. More particularly, the audio file is stamped on the visual signature thereof. The time-stamp especially comprises the start and end time of the conversation wherein, the actual time-difference between the start and end times of a segment ranges between 30 minutes to even several hours as the periods of silence combined with commonplace sounds may continue for several hours. The time-stamped segments are then proceeded to be transitorily stored within a target database, which is a part component of the target device.

Referring to FIG. 4, the method further includes transmitting (step 108) the time-stamped segments stored within the target database to a central device. The central device comprises a central database comprising a plurality of target entries, each target entry is representative of a target device. Each target entry is associated with a location entry, which represents the location at which the corresponding target device is covertly installed. In an alternate embodiment, the target entry may itself by the location entry. The transmission method (step 108) includes assigning every target device a time window, which is defined between a start and an end time. The time window is assigned to a target device at the designated time window, transmits the segments stored within the corresponding target database in a chronological order. Notably the transmission of one device at a time is instrumental in the prevention of infrastructure overload. Referring to FIG. 1, the transmission may comprise a wireless transmission over a communication network or wired transmission via a suitable cable, preferably a Cat5 cable. The segments thus transmitted from the target devices are stored within the central database. More particularly, each segment is associated with the corresponding target entry within the central database. The method further includes issuing an alert in the event of the central device not receiving segments from a target device during the time window designated thereto.

Referring to FIG. 4, the method further includes providing (step 110) a user interface for enabling a user to access the segments stored within the central database. The user interface comprises necessary input fields for enabling a user to retrieve segments from the central database based on custom time window defined between a start and end times, date and the location of the corresponding target device. The retrieved segments are delivered to a user terminal over a communications network. In one embodiment, in addition to a microphone, each target device may be associated with at least one of additional devices comprising a smoke sensor, cell phone signal detection sensor, motion sensor and a video camera so as to gather additional intelligence from the additional devices. In an additional embodiment, the method further includes e enabling an external means for retrieving segments from the central database. The external means may comprise a link analysis system or a visualizer tool for further analysis of the segments.

The aforementioned embodiments are able to be implemented, for example, using a machine-readable medium or article which is able to store an instruction or a set of instructions that, if executed by a machine, cause the machine to perform a method and or operations described herein. Such machine is able to include, for example, any suitable processing platform, computing platform, computing device, processing device, electronic device, electronic system, computing system, processing system, computer, processor and is able to be implemented using any suitable combination of hardware and or software. The machine-readable medium or article is able to include, for example, any suitable type of memory section, memory device, memory article, memory medium, storage device, storage article, storage medium and/or storage section; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette. The instructions is able to include any suitable type of code, for example, source code, compiled code, interpreted code, executable code, static code, dynamic code, or the like, and is able to be implemented using any suitable high-level, low-level, object-oriented, visual, compiled and or interpreted programming language, e.g., C, C++, Java, BASIC, Pascal, Fortran, Cobol, assembly language, machine code. Functions, operations, components and or features described herein with reference to one or more embodiments, is able to be combined with, or is able to be utilized in combination with, one or more other functions, operations, components and or features described herein with reference to one or more other embodiments, or vice versa.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer-implemented criminal intelligence gathering system adapted to be deployed within a confinement facility, the system comprising:
    (a) a plurality of target devices installed at strategic locations within the confinement facility, each target device comprising;
        (i) a microphone;
        (ii) a compression module for eliminating periods of silence from the auditory information captured the corresponding microphone resulting in the generation of compressed auditory information;
        (iii) a segment module for segmenting the compressed auditory information, each segment being of a predetermined duration; and
        (iv) a stamp module for date and time-stamping each segment; and
    (b) a central device disposed in operative communication with the target devices, the central device comprising
        (i) a central database listed with a plurality of target entries, each of which representing a target device installed at a strategic location, the central database configured to receive the stamped segments from the target devices at least one target device at a time, the received segments, when being stored within the central database, associated with the corresponding target entry; and
        (ii) a user interface for enabling remote retrieval of a segment stored within the central database based on date, time and the location at which the corresponding target device is installed.

2. The system of claim 1 wherein, each target device is covertly installed.

3. The system of claim 1 wherein, the confinement facility comprises a prison.

4. The system of claim 1 wherein, each target entry is associated with a location entry, which represents the location at which the corresponding target device is deployed.

5. The system of claim 4 wherein, a location comprises one of a confinement cell, a common ventilator for two adjacent confinement cells, a HVAC vent, a cleaning closet, a maintenance room, and a vehicle employed within the confinement facility, the confinement cell being one of a plurality of confinement cells, which are a part of the confinement facility.

6. The system of claim 5 wherein, a confinement cell comprises a prison cell.

7. The system of claim 1 wherein, the central device is configured to receive segments from the target devices one target device at a time.

8. The system of claim 1 wherein, each target device is assigned a time window so that, the segments the target device are received by the central database within the corresponding time window.

9. The system of claim 8 wherein, the central device comprises an alert module for issuing an alert in the event of the central device not receiving segments from a target device during the time window designated thereto.

10. The system of claim 1 wherein, the compression module is further configured to eliminate commonplace sounds including toilet flushes, door slams, and running water, bed creaks.

11. The system of claim 1 wherein, the central database is disposed in operative communication with at least one external analysis system so that, the stored segments are accessed and analyzed and or processed by the at least one external system.

12. The system of claim 11 wherein, each of the at least one external system comprises one of a link analysis system and a visualization tool.

13. The system of claim 1 wherein, each target device, in addition to the corresponding microphone, is operatively associated with at least one of a smoke sensor, a cell phone signal detection sensor, a video camera and a motion sensor.

14. The system of claim 1 wherein, each segment comprises a sequential file.

15. The system of claim 1 wherein, the compression module is configured to recognize speech and voice.

16. A computer-implemented criminal intelligence gathering method employed within a confinement facility, the method comprising:
    (a) eliminating periods of silence from auditory information captured by a microphone, which is a part of a target device installed at a strategic location within the confinement facility, the elimination resulting in the generation of compressed auditory information;
    (b) dividing the compressed auditory information into segments, each of which being of a predetermined duration; and
    (c) date and time-stamping each segment;

(d) listing a plurality of target entries within a central database, each target entry representing a target device strategically installed at a location within the confinement facility;

(e) within the central database, receiving the segmented auditory information from the target devices at least one target device at a time, the received auditory information stored within the central database such that, the received auditory information is associated with the corresponding target entry; and (f) providing a user interface for enabling remote retrieval of a segment auditory information from the central database based on date, time and the location of the corresponding target device.

17. The method of claim 16 wherein, each target device is covertly installed.

18. The method of claim 16 wherein, the confinement facility comprises a prison.

19. The method of claim 16 wherein, each target entry is associated with a location entry, which represents the location at which the corresponding target device is deployed.

20. The method of claim 19 wherein, a location comprises one of a confinement cell, a common ventilator for two adjacent confinement cells, a HVAC vent, a cleaning closet, a maintenance room, and a vehicle employed within the confinement facility, the confinement cell being one of a plurality of confinement cells, which are a part of the confinement facility.

21. The method of claim 20 wherein, a confinement cell comprises a prison cell.

22. The method of claim 16 further comprising receiving segments from the target devices one target device at a time.

23. The method of claim 22 wherein, each target device is assigned a time window so that, the segments from the target device is received within the central database within the corresponding time window.

24. The method of claim 23 further comprising issuing an alert in the event of the central database not receiving segmented auditory information from a target device during the time window designated thereto.

25. The method of claim 16 further comprising, along with the periods of silence, eliminating commonplace sounds including toilet flushes, door slams, running water and bed creaks.

26. The method of claim 16 wherein, the central database is disposed in operative communication with at least one external analysis system so that, the stored segments are accessed and analyzed and/or processed by the at least one external system.

27. The method of claim 26 wherein, each of the at least one external system comprises one of a link analysis system and a visualizer tool.

28. The method of claim 16 wherein, the target device is operatively associated with at least one of a smoke sensor, a cell phone signal detection sensor, a video camera and a motion sensor.

29. The method of claim 16 wherein, each segment comprises a sequential file.

* * * * *